US011898722B2

(12) United States Patent
Gao

(10) Patent No.: US 11,898,722 B2
(45) Date of Patent: Feb. 13, 2024

(54) LIGHT FIXTURE

(71) Applicant: ACEVEL (GD) CO., LTD., Guangdong (CN)

(72) Inventor: Meiqin Gao, Guangzhou (CN)

(73) Assignee: ACEVEL (GD) CO., LTD., Guangzhou (CN)

(*) Notice: Subject to any disclaimer, the term of this patent is extended or adjusted under 35 U.S.C. 154(b) by 0 days.

(21) Appl. No.: 18/004,862

(22) PCT Filed: Oct. 27, 2020

(86) PCT No.: PCT/CN2020/123885
§ 371 (c)(1),
(2) Date: Jan. 9, 2023

(87) PCT Pub. No.: WO2022/007252
PCT Pub. Date: Jan. 13, 2022

(65) Prior Publication Data

US 2023/0243477 A1 Aug. 3, 2023

(30) Foreign Application Priority Data

Jul. 7, 2020 (CN) ........................ 202010647682.0

(51) Int. Cl.
*F21V 21/22* (2006.01)
*F21V 21/26* (2006.01)
(Continued)

(52) U.S. Cl.
CPC .............. *F21S 8/063* (2013.01); *F21V 21/22* (2013.01); *F21V 21/26* (2013.01); *F21V 21/30* (2013.01)

(58) Field of Classification Search
CPC ................................ F21V 21/26; F21V 21/30
See application file for complete search history.

(56) References Cited

U.S. PATENT DOCUMENTS 10,670,240 B2 * 6/2020 Shih ...................... F21V 23/001
2017/0299151 A1 * 10/2017 Luo .................... F21V 19/0055
(Continued)

FOREIGN PATENT DOCUMENTS

CN 205137151 U 4/2016
CN 205331954 U 6/2016
(Continued)

*Primary Examiner* — Eric T Eide
(74) *Attorney, Agent, or Firm* — Conley Rose, P.C.; Brooks W Taylor

(57) ABSTRACT

A light fixture, comprising a main body box (1), a guide rail head (2) positioned above the main body box (1) and capable of rotating relative to the main body box (1), and a light barrel (3) positioned on at least one side of the main body box (1) and capable of swinging up and down relative to the main body box (1), wherein a radiator (32) and a first light source (33) are arranged in the light barrel (3); the main body box (1) comprises a main body box top cover (11), a main body box bottom plate (12) and a main body box side plate (13) connected between the main body box top cover (11) and the main body box bottom plate (1); and the guide rail head (2) is pivotally connected to the main body box top cover (11), and the light barrel (3) is pivotally connected to the main body box side plate (13). The guide rail head of the light fixture can rotate in a horizontal direction relative to the main body box for adjustment, and the light barrel of the light can swing in a vertical direction relative to the main body box for adjustment, such that the irradiation angle and the irradiation range of the light barrel can be adjusted and various lighting requirements can be met.

7 Claims, 14 Drawing Sheets

(51) Int. Cl.
*F21V 21/30* (2006.01)
*F21S 8/06* (2006.01)

(56) References Cited

U.S. PATENT DOCUMENTS

| | | | | |
|---|---|---|---|---|
| 2020/0200374 | A1* | 6/2020 | Gielen | F21V 21/116 |
| 2021/0254820 | A1* | 8/2021 | Spiro | G09F 13/0413 |

FOREIGN PATENT DOCUMENTS

| | | | |
|---|---|---|---|
| CN | 109539019 | A | 3/2019 |
| CN | 209084502 | U | 7/2019 |
| CN | 209445251 | U | 9/2019 |
| CN | 111664393 | A | 9/2020 |

* cited by examiner

LIGHT FIXTURE

CROSS-REFERENCE TO RELATED APPLICATIONS

This is a U.S. National Stage of International Patent Application No. PCT/CN2020/123885 filed Oct. 27, 2020, which claims priority to Chinese Patent Application 202010647682.0 filed Jul. 7, 2020. Both of the aforementioned applications are hereby incorporated by reference in their entireties.

TECHNICAL FIELD

The present disclosure relates to a technical field of illumination, and specifically to a light fixture.

BACKGROUND OF THE INVENTION

In prior art, some light fixtures are often used for decoration in indoor or outdoor decoration. Chandelier or track light is one of the light fixtures.

The light fixture in prior art generally has a light barrel with fixed irradiation angle which cannot be adjusted, and thus cannot meet the need to adjust the irradiation angle or range.

In view of this, it is necessary to provide a light fixture that can adjust the irradiation angle.

SUMMARY

The technical solution of the present disclosure provides a light fixture comprising a main body box, a guide rail head located above the main body box and capable of rotating relative to the main body box and a light barrel located on at least one side of the main body box and capable of swinging up and down relative to the main body box, wherein, a radiator and a first light source are provided in the light barrel; the main body box comprises a main body box top cover, a main body box bottom plate and a main body box side plate connected between the main body box top cover and the main body box bottom plate; and the guide rail head is pivotally connected to the main body box top cover, the light barrel is pivotally connected to the main body box side plate.

Further, the light barrel is connected to the main body box side plate through a light barrel pivot shaft.

Further, the light barrel pivot shaft is configured in an upper part of the main body box side plate or in the lower part of the main body box side plate.

Further, the main body box side plate is provided with a holding groove and the light barrel pivot shaft is rotatably configured in the holding groove; the light barrel pivot shaft is positioned in the holding groove by a fastener; a groove bottom perforation is provided in a groove bottom of the holding groove; the fastener passes from the main body box through the groove bottom perforation, the fastener is able to slide up and down in the groove bottom perforation; and the fastener is removably connected to the light barrel pivot shaft.

Further, the light barrel pivot shaft is provided with a connection plate; and the connection plate is connected to the light barrel.

Further, the light barrel pivot shaft is provided with a plugging plate; and the plugging plate is inserted into the light barrel and connected to the radiator.

Further, more than two light barrels are provided on at least one main body box side plate.

Further, at least one light barrel is provided on each main body box side plate, and the light barrels on two main body box side plates are arranged symmetrically.

Further, a second light source is provided in the main body box; and the main body box bottom plate is provided with light-transmitting holes, or the main body box bottom plate is a light guide plate.

Further, a suspension arm is connected to the underside of the guide rail head; an upper end of the suspension arm is removably connected to the guide rail head and a lower end of the suspension arm is pivotably connected to the main body box top cover; or an upper end of the suspension arm is pivotally connected to the guide rail head and a lower end of the suspension arm is removably connected to the main body box top cover.

The above technical solutions can produce the following beneficial effects:

In the light fixture provided by the present disclosure, the guide rail head can be rotated and adjusted in a horizontal direction relative to the main body box, and the light barrel can be swung and adjusted in a vertical direction relative to the main body box, so that the irradiation angle and range of the light barrel can be adjusted to meet a variety of lighting needs.

DESCRIPTION OF EXEMPLARY EMBODIMENTS

Figure 1:
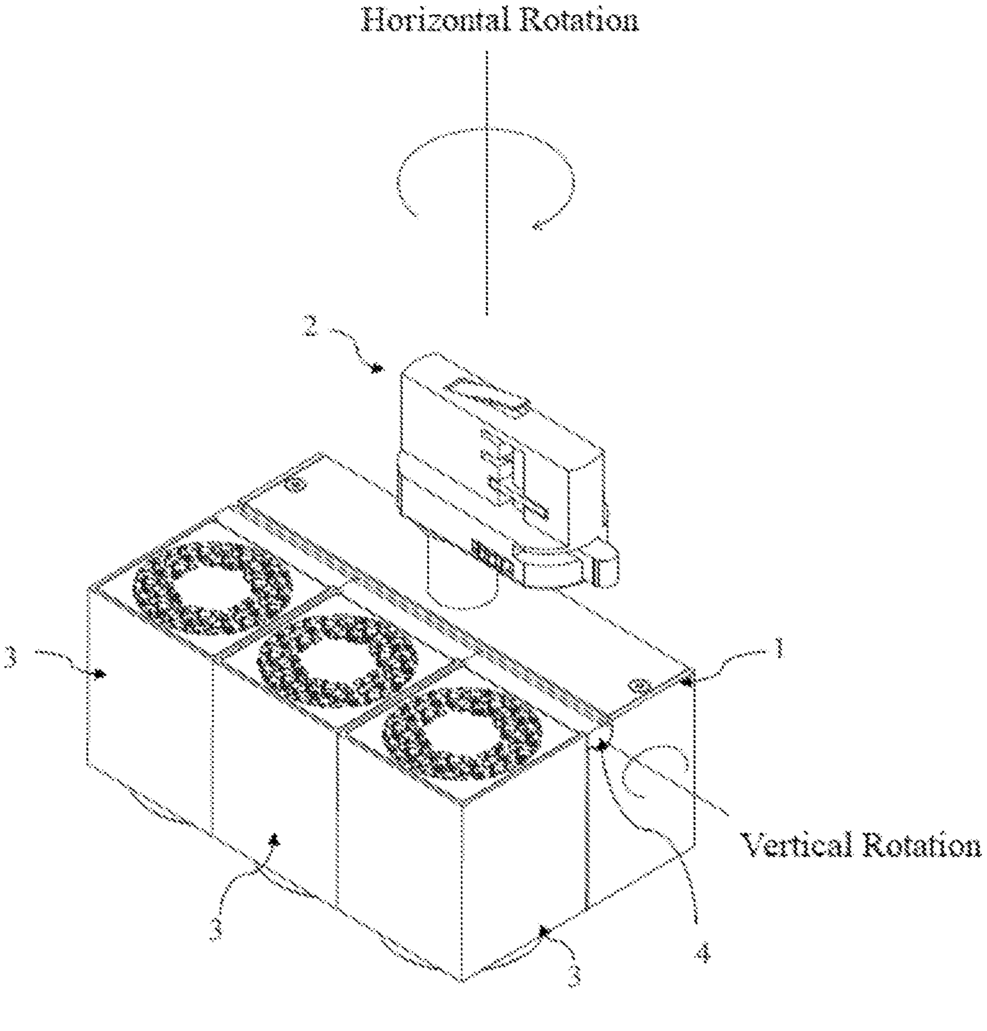
FIG. 1 is a perspective view of a light fixture provided by a first embodiment of the disclosure.

Embodiments of the present disclosure are further described below with reference to the figures. Wherein, the same reference numeral denotes the same part. It should be noted that, terms as used in the following description, "front", "rear", "left", "right", "up" and "down" indicate a direction in the figures, and terms "inner" and "outer" respectively indicate the direction towards or away from a geometric center of a particular part.

As shown in FIG. 1, FIGS. 7-8, FIGS. 13-14 and FIG. 16, a light fixture provided by an embodiment of the present disclosure comprises a main body box 1, a guide rail head 2 located above the main body box 1 and capable of rotating with respect to the main body box 1, and a light barrel 3 located on at least one side of the main body box 1 and capable of swinging up and down with respect to the main body box 1.

A radiator 32 and a first light source 33 are provided inside the light barrel 3. The main body box 1 comprises a main body box top cover 11, a main body box bottom plate 12 and a main body box side plate 13 connected between the main body box top cover 11 and the main body box bottom plate 12.

The guide rail head 2 is pivotally connected to the main body box top cover 11 and the light barrel 3 is pivotally connected to the main body box side plate 13.

The light fixture provided in the disclosure, may be a chandelier or a track light.

The light fixture provided in the disclosure mainly comprises the main body box 1, the guide rail head 2 and the light barrel 3.

The main body box 1 plays a role of installing the light barrel 3, and the main body box 1 may be a power box.

The guide rail head 2 is used to hang on a guide rail, or hang in a designated position.

Pivoting connection in the present disclosure refers to a connection in which two parts are connected by a pivot or a hinge, and the two parts can be rotated or swung relative to each other.

The guide rail head 2 is pivotally connected to the main body box 1, and the guide rail head 2 can be rotated relative to the main body box 1, or the main body box 1 can be rotated relative to the guide rail head 2.

The light barrel 3 is mounted on a side of the main body box 1, the light barrel 3 is pivotally connected to the main body box 1, and light barrel 3 can be swung or rotated relative to the main body box 1.

The main body box 1 comprises the main body box top cover 11, the main body box bottom plate 12, the main body box side plate 13 and a main body box cover plate 14.

The main body box top cover 11 and the main body box bottom plate 12 are connected by two main body box side plates 13 on two sides, and the main body box top cover 11 and the main body box bottom plate 12 are connected by two main body box cover plates 14 on the other two sides, so that the main body box 1 is a box with an internal cavity.

As shown in FIGS. 2-4 and FIGS. 9-11, the light barrel 3 comprises a light barrel trim cover 31, the radiator 32, the first light source 33, and a first lens 34. The first light source 33 may be an LED light.

The radiator 32 is mounted in the light barrel 3 and the first light source 33 is mounted on the radiator 32 via a bracket, and the radiator 32 is used to dissipate heat from the first light source 33. The first light source 33 can be connected to an external power supply via a wire which can passes through the main body box 1. The first lens 34 is arranged in a light outlet of the light barrel 3 and is used to focus the light emitted by the first light source 33.

During installation, the guide rail head 2 is pivotally connected to the main body box top cover 11, and the light barrel 3 is pivotally connected to the main body box side plate 13. The light barrel 3 may be installed on each main body box side plate 13 or on only one main body box side plate 13.

By means of such arrangement, the main body box 1 can be rotated to adjust the angle or orientation of the main body box 1 after the guide rail head 2 has been hung in the specified position, and the light barrel 3 can be swung up and down to adjust the irradiation angle and range of the light barrel 3.

The main body box 1 may be positioned by a positioning pin or locked by a locking member, after being rotated and adjusted relative to the guide rail head 2 to be in place.

The light barrel 3 may be positioned by a positioning pin or locked by a locking member, after being swung relative to the main body box 1 to be in place.

Thus, in the light fixture provided in the disclosure, the guide rail head can be rotatably adjusted in a horizontal direction relative to the main body box, and the light barrel can be swung and adjusted in a vertical direction relative to the main body box, so that the irradiation angle and irradiation range of the light barrel can be adjusted to meet a variety of lighting needs.

In one embodiment, as shown in FIGS. 1-16, the light barrel 3 is connected to the main body box side plate 13 by a light barrel pivot shaft 4.

The light barrel 3 is fixedly connected to the light barrel pivot shaft 4, and the light barrel pivot shaft 4 is rotatably mounted on the main body box side plate 13 so that the light barrel 3 can be rotated about the light barrel pivot shaft 4 to facilitate installation and adjustment of the light barrel 3.

In one embodiment, as shown in FIGS. 1-2, FIG. 4, and FIG. 7, the light barrel pivot shaft 4 is configured in an upper portion of the main body box side plate 13. As shown in FIGS. 8-9, FIG. 11, and FIGS. 13-16, the light barrel pivot shaft 4 is configured in a lower portion of the main body box side plate 13.

The light barrel pivot shaft 4 has various mounting modes, and it may be mounted in the upper, lower or central part of the main body box side plate 13, thus allowing the light barrel 3 to be mounted in different positions to meet needs of different places.

Figure 2:
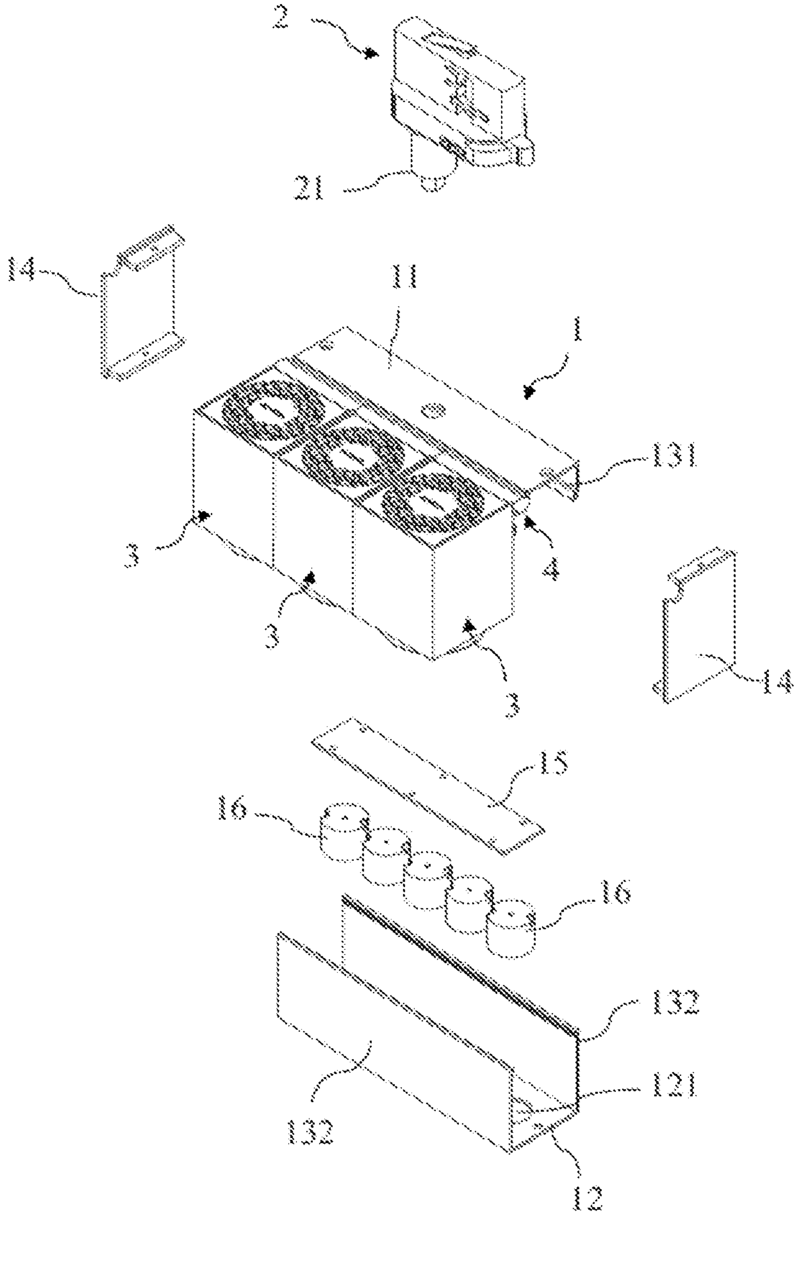
FIG. 2 is an explosive view of the light fixture provided by the first embodiment of the disclosure.
Figure 3:
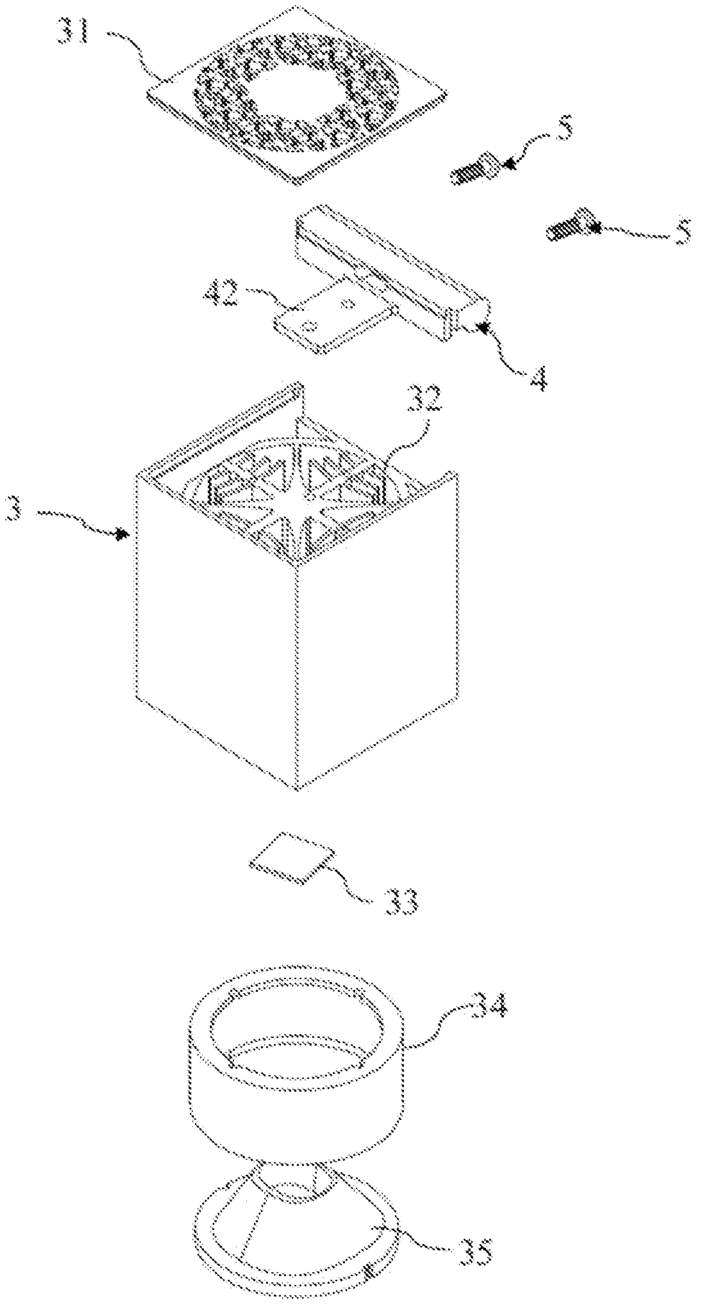
FIG. 3 is an explosive view of the light barrel and the light barrel pivot shaft in the light fixture provided by the first embodiment of the present disclosure.
Figure 4:
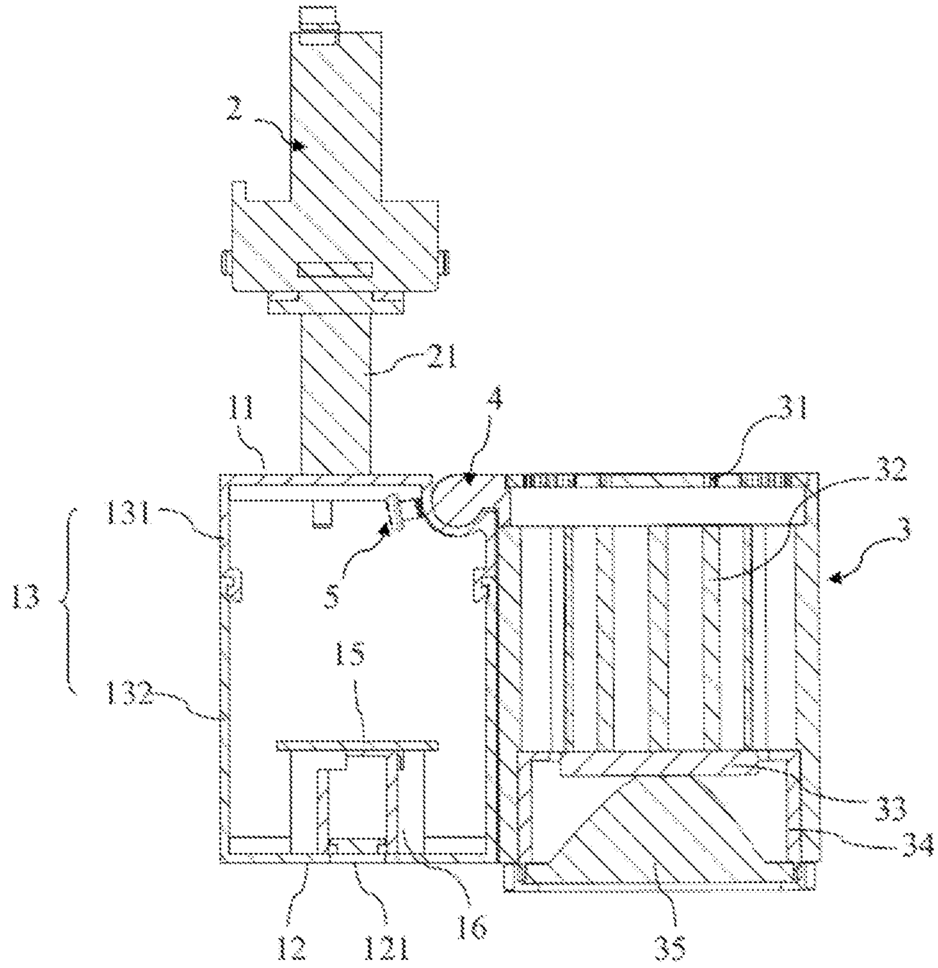
FIG. 4 is a cutaway view of the light fixture provided by the first embodiment of the present disclosure.

As shown in FIG. 2 and FIG. 4, the main body box side plate 13 comprises an upper plate 131 and a lower plate 132, which are snap-fitted together. The light barrel pivot shaft 4 may be configured on the upper plate 131 or the light barrel pivot shaft 4 may be configured on the lower plate 132 to meet different installation requirements.

Figure 5:
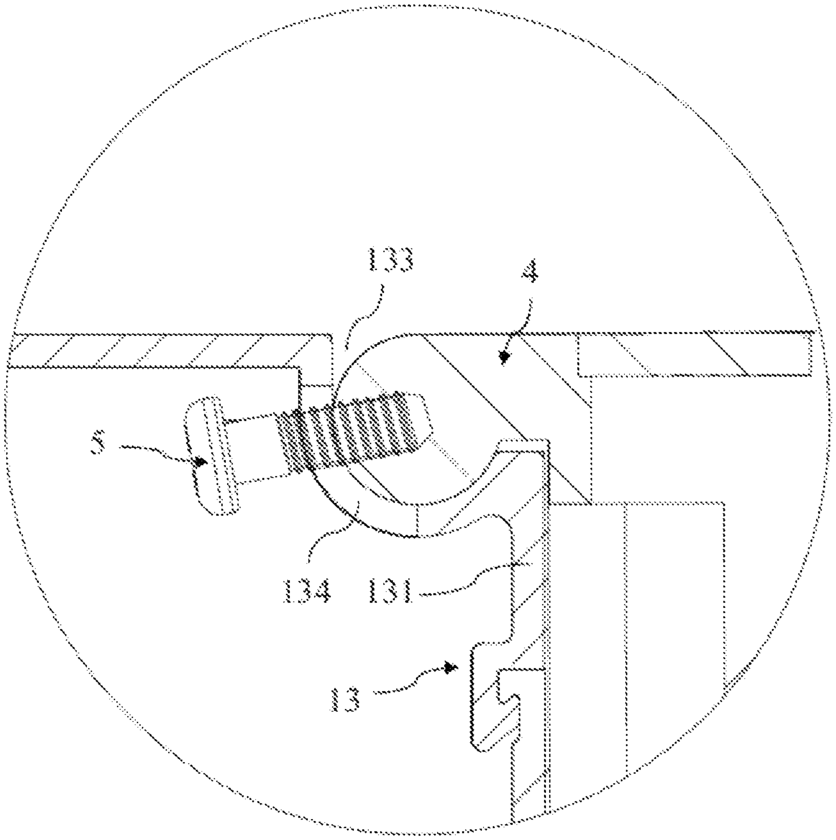
FIG. 5 is an enlarged view showing that the light barrel pivot shaft in the light fixture shown in FIG. 4 is positioned in a holding groove in the main body box side plate by a fastener.
Figure 6:
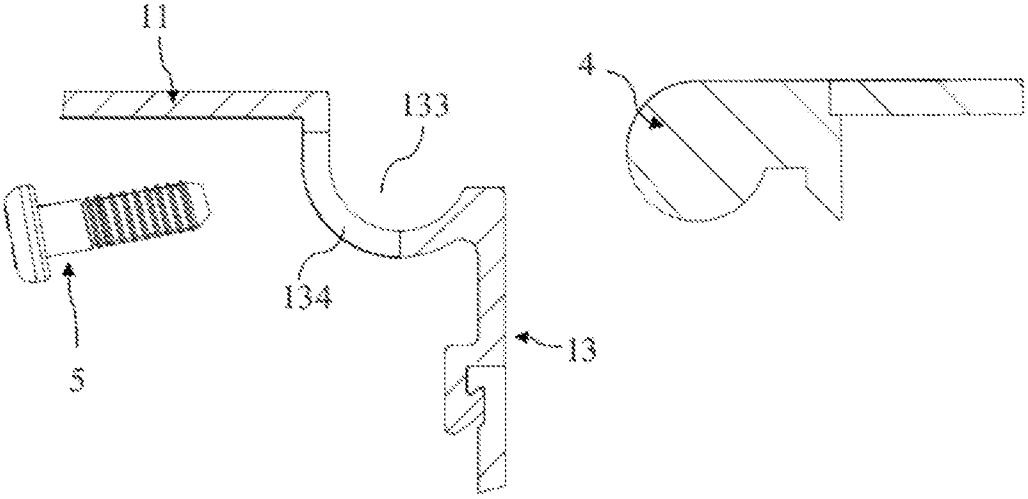
FIG. 6 is an explosive view of FIG. 5.
Figure 12:
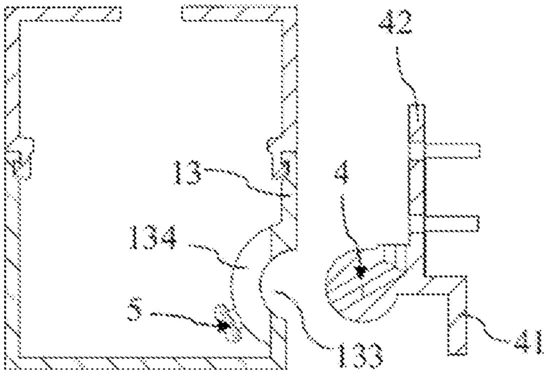
FIG. 12 is an explosive view of the light barrel pivot shaft, the fastener and the main body box in the light fixture shown in FIG. 4.

In one embodiment, as shown in FIGS. 5-6 and 12, the main body box side plate 13 is provided with a holding groove 133 and the light barrel pivot shaft 4 is rotatably configured within the holding groove 133. The light barrel pivot shaft 4 is positioned in the holding groove 133 by a fastener 5.

A groove bottom perforation 134 is provided in a groove bottom of the holding groove 133. The fastener 5 passes from the main body box 1 through the groove bottom perforation 134, and the fastener 5 is able to slide up and down in the groove bottom perforation 134.

The fastener 5 is removably connected to the light barrel pivot shaft 4.

The holding groove 133 is curved and the light barrel pivot shaft 4 is configured within the holding groove 133 and is rotatable within the holding groove 133. The holding groove 133 provides a mounting and pivoting position for the light barrel pivot shaft 4. After the light barrel 3 is swung into place, the light barrel pivot shaft 4 is locked or positioned in the holding groove 133 through the fastener 5.

Specifically, the groove bottom of the holding groove 133 has the groove bottom perforation 134, and during installation, the fastener 5 passes through the groove bottom perforation 134 from the inside of the main body box 1, and the fastener 5 is in clearance fit with the groove bottom perforation 134, and the fastener 5 can slide up and down in the groove bottom perforation 134 to adapt to the rotation angle of the light barrel pivot shaft 4, and after the light barrel pivot shaft 4 is rotated into place, the fastener 5 is tightened to fix the light barrel pivot shaft 4 in the holding groove 133.

The fastener 5 can be a screw, a threaded hole is provided in the light barrel pivot shaft 4 and an end of the screw is screwed into the threaded hole to achieve a removable connection between the fastener 5 and the light barrel pivot shaft 4.

A plurality of fasteners 5 can be provided as needed to improve the tightening of the light barrel pivot shaft 4.

Figure 10:
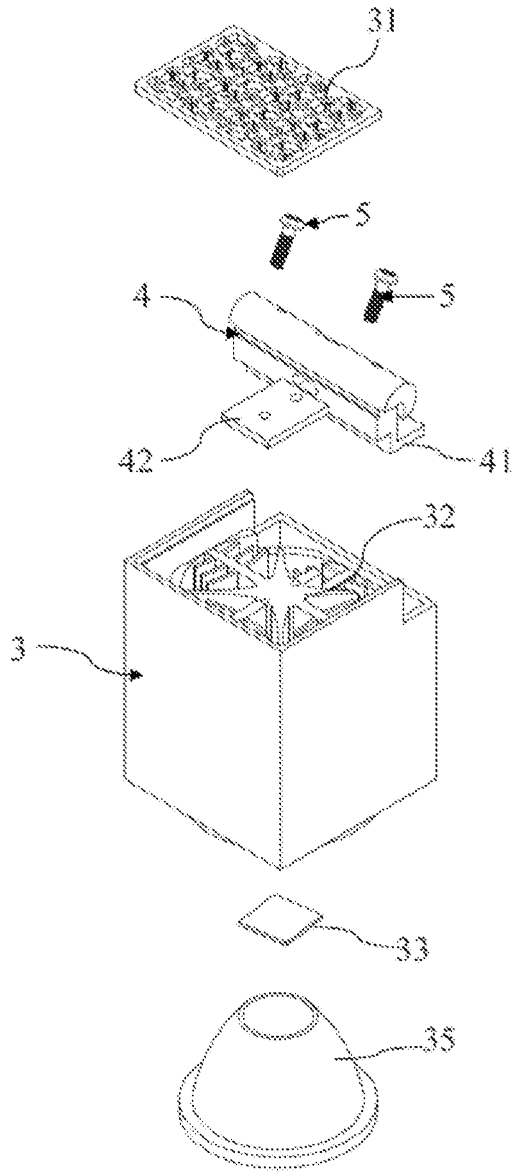
FIG. 10 is an explosive view of the light barrel and the light barrel pivot shaft in the light fixture provided by the third embodiment of the present disclosure.
Figure 11:
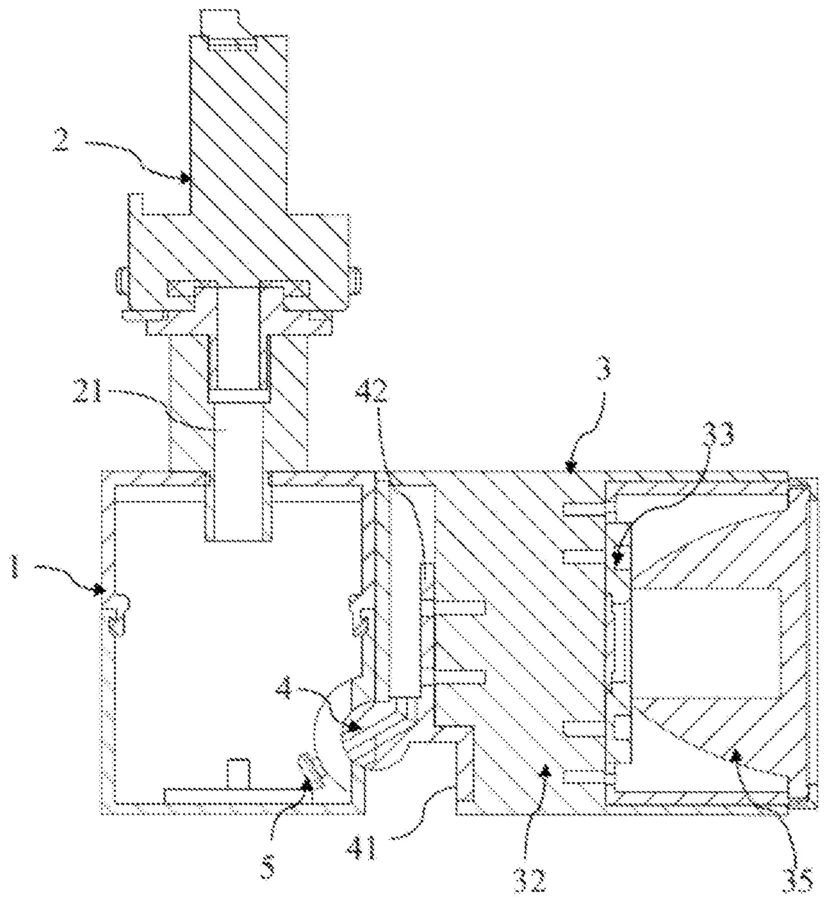
FIG. 11 is a cutaway view of the light fixture provided by the third embodiment of the present disclosure.

In one embodiment, as shown in FIGS. 10-12, the light barrel pivot shaft 4 is provided with a connection plate 41, which is connected to the light barrel 3. The connection plate 41 is integrally formed with the light barrel pivot shaft 4 and is fixedly connected to the light barrel 3 by the screw, thereby assembling the light barrel pivot shaft 4 with the light barrel 3.

In one embodiment, as shown in FIG. 3 and FIGS. 10-12, the light barrel pivot shaft 4 is provided with a plugging plate 42, which is inserted into the light barrel 3 and connected to the radiator 32.

The plugging plate 42 is integrally formed with the light barrel pivot shaft 4. An opening is provided in a lower part of the light trim cover 31 of the light barrel 3, and the opening is located above the radiator 32. The plugging plate 42 is inserted into the light barrel 3 through the opening and is connected to the radiator 32 by the screw, to mount the light barrel pivot shaft 4 and the light barrel 3 together. The stability of the connection between the light barrel pivot shaft 4 and the light barrel 3 is improved by connecting the plugging plate 42 and the connection plate 41 to the radiator 32 and the light barrel 3 respectively.

Figure 8:
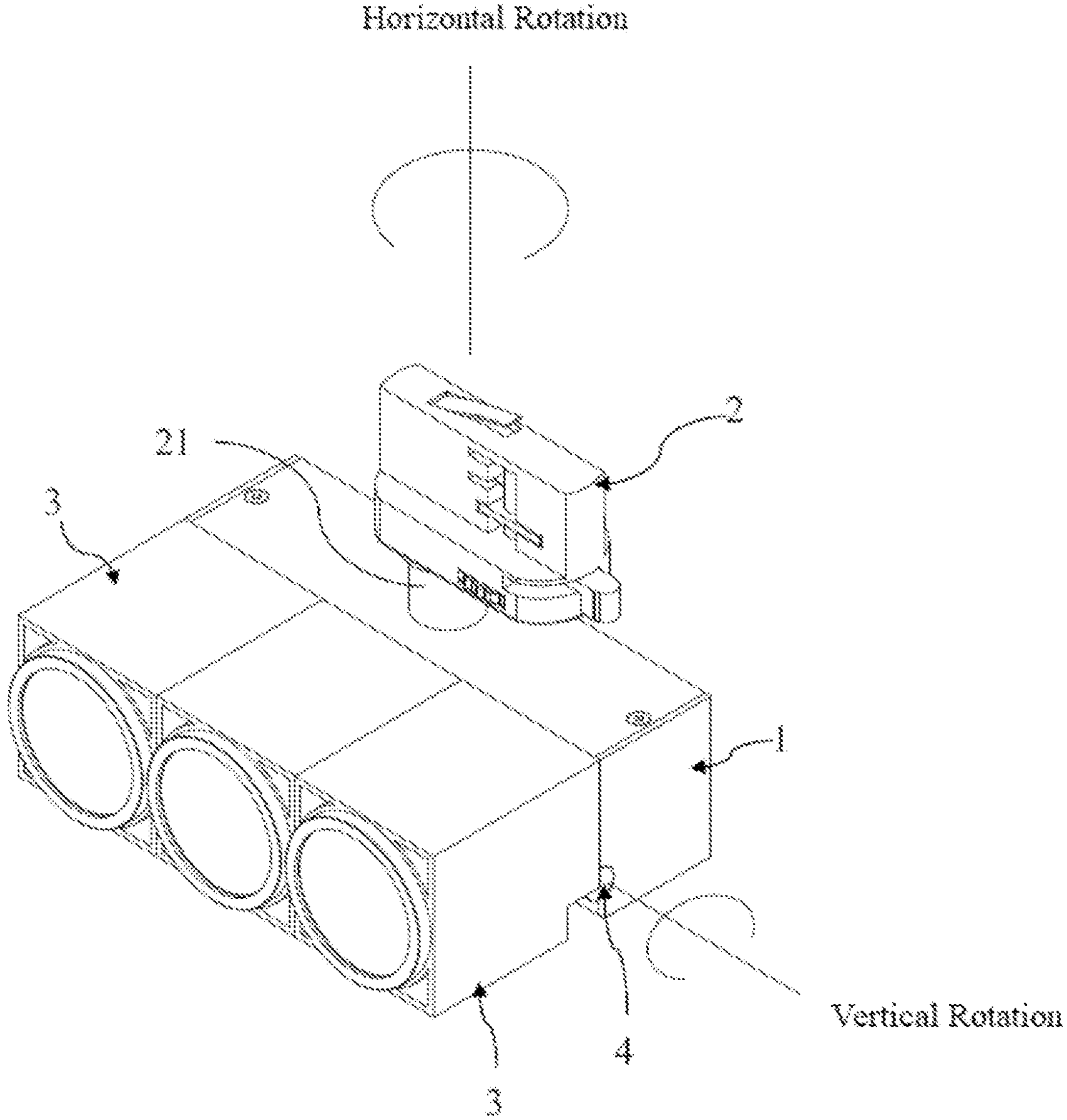
FIG. 8 is a perspective view of a light fixture provided by a third embodiment of the present disclosure.
Figure 9:
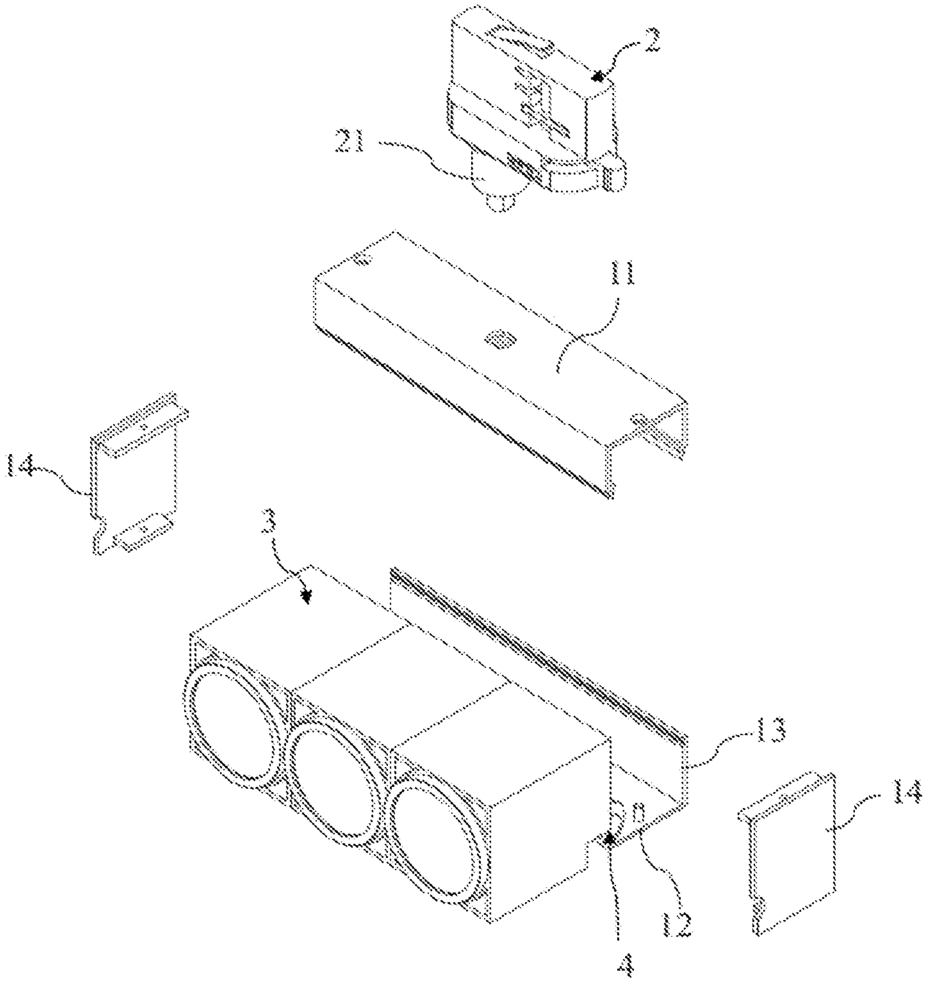
FIG. 9 is an explosive view of the light fixture provided by the third embodiment of the present disclosure.
Figure 13:
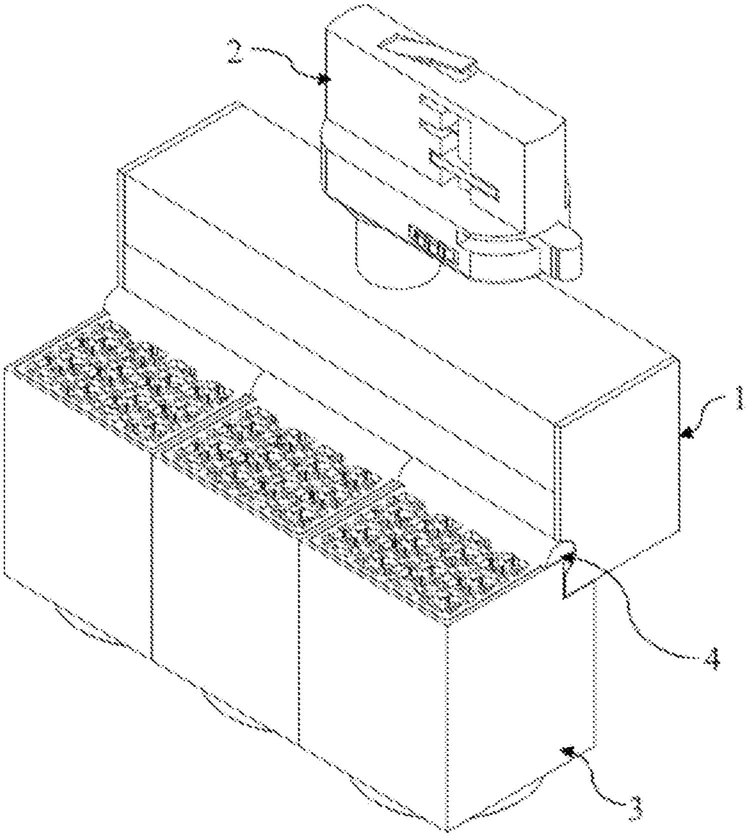
FIG. 13 is a schematic diagram of the light fixture provided by the third embodiment of the present disclosure with the light barrel facing vertically downward.

In one embodiment, as shown in FIG. 1, FIG. 8 and FIG. 13, more than two light barrels 3 are provided on at least one main body box side plate 13 to achieve an unilateral arrangement of light barrels 3, suitable for decorating the location near corners or walls of the place for accent lighting.

Figure 7:
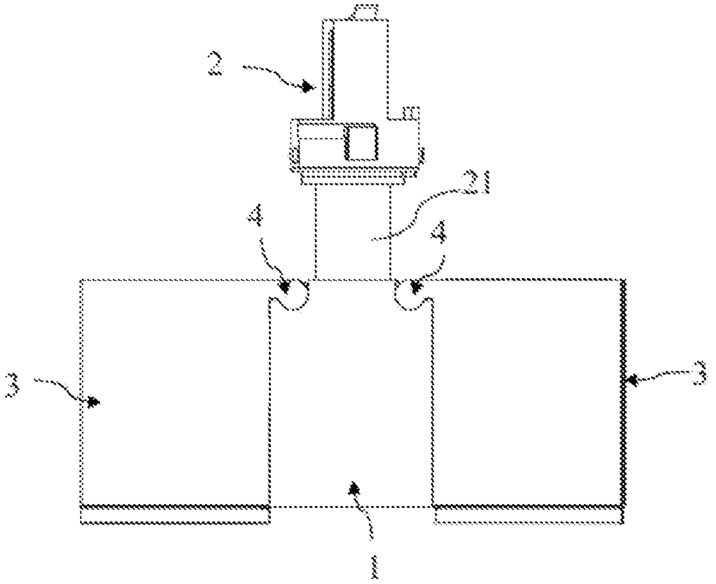
FIG. 7 is a schematic diagram of a light fixture provided by a second embodiment of the present disclosure.
Figure 14:
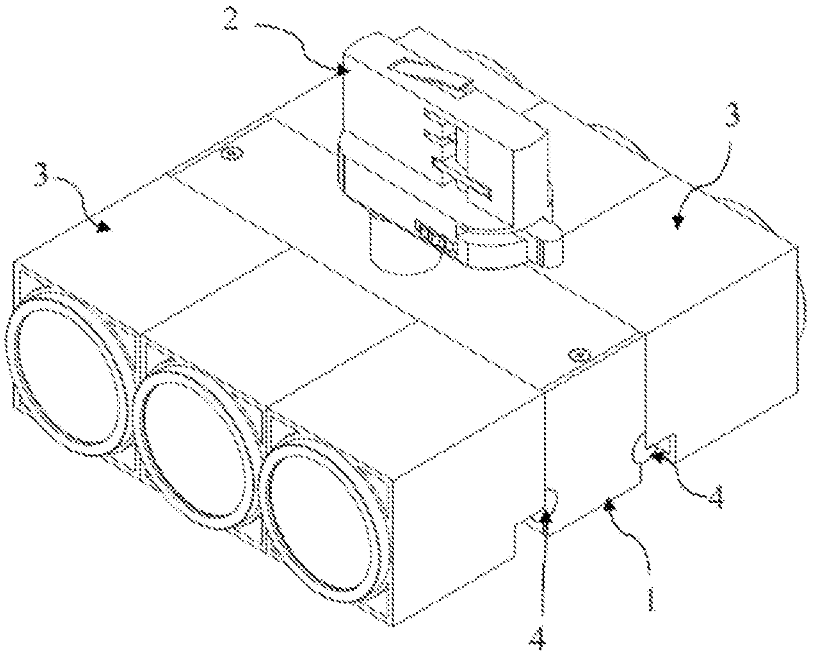
FIG. 14 is a perspective view of a light fixture provided by a fourth embodiment of the present disclosure.
Figure 15:
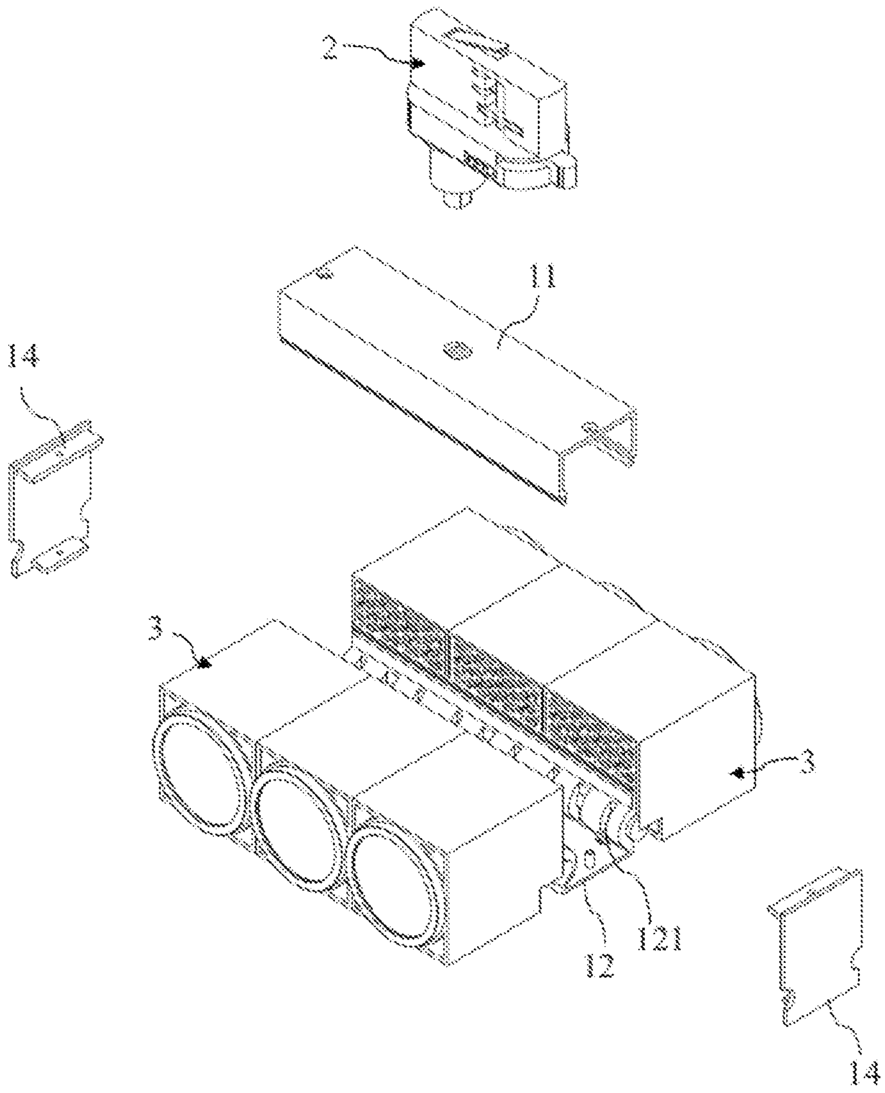
FIG. 15 is an explosive view of the light fixture provided by the fourth embodiment of the present disclosure.
Figure 16:
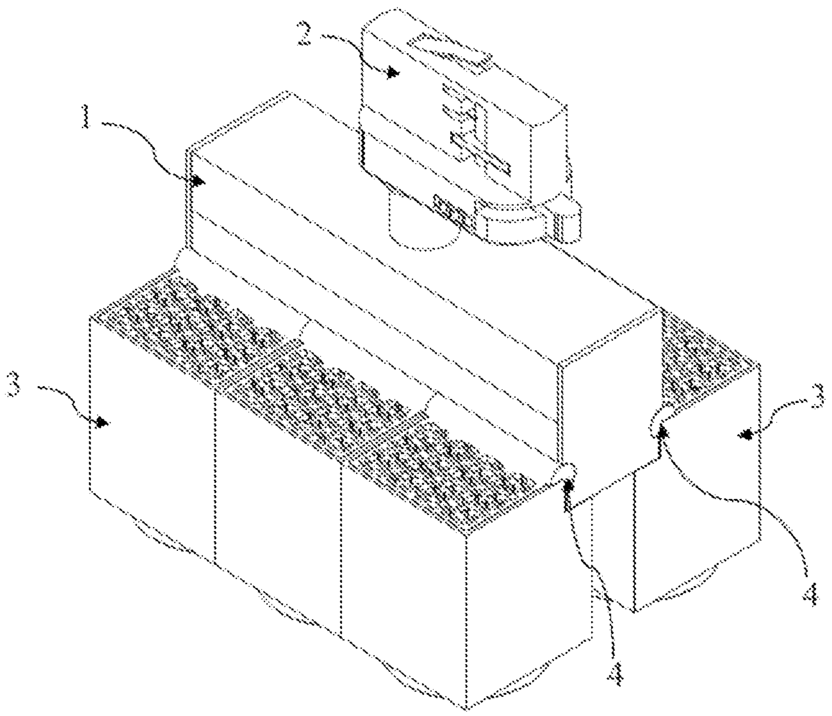
FIG. 16 is a schematic diagram of the light fixture provided by the fourth embodiment of the present disclosure with the light barrel facing vertically downward.

In one embodiment, as shown in FIG. 7, FIG. 14 and FIG. 16, at least one light barrel 3 is provided on each main body box side plate 13, and the light barrels 3 on two main body box side plates 13 are arranged symmetrically to achieve a bilateral arrangement of light barrels 3, suitable for decorating the location in the central area of the place for accent lighting.

In one embodiment, as shown in FIGS. 2 and 4, a second light source 15 is provided in the main body box 1.

The main body box bottom plate 12 is provided with light-transmitting holes 121, or the main body box bottom plate 12 is a light guide plate.

The second light source 15 may be an LED light source, and a plurality of second light sources 15 can be provided in the main body box 1. Preferably, the second light source 15 is an LED light panel.

The second light source 15 is mounted in the main body box 1, and can be mounted by a light stand or a bracket.

In order to transmit the light of the second light source 15, more than one light-transmitting hole 121 can be provided in the main body box bottom plate 12, or the main body box bottom plate 12 can be directly provided as a light guide plate, and the light from the second light source 15 can be transmitted through the light-transmitting hole, or directed out by the light guide plate.

In order to improve the illumination effect, a second lens 16 is arranged between the main body box bottom plate 12 and each second light source 15, to focus the light from the second light source 15. When more than one light-transmitting hole 121 is provided on the main body box bottom plate 12, a second lens 16 is arranged between each light-transmitting hole 121 and each second light source 15.

In one embodiment, as shown in FIGS. 1-2, FIG. 4, FIGS. 7-9 and FIGS. 13-16, a suspension arm 21 is attached to the underside of the guide rail head 2.

A first connection mode is that: an upper end of the suspension arm 21 is removably connected to the guide rail head 2 and a lower end of the suspension arm 21 is pivotally connected to the main body box top cover 11.

A second connection mode is that: the upper end of the suspension arm 21 is pivotally connected to the guide rail head 2 and the lower end of the suspension arm 21 is removably connected to the main body box top cover 11.

Specifically, in the first connection mode, the upper end of the suspension arm 21 can be removably connected to the guide rail head 2 by a pin, a snap-fit structure, a threaded structure and so on, and the lower end of the suspension arm 21 can be pivotally connected to the main body box top cover 11 by a bearing, a collar and so on. A circle of positioning holes can be provided in the main body box top cover 11, and a telescopic pin can be provided on the suspension arm 21, so that after the suspension arm 21 is rotated into place, the telescopic pin is extended and inserted into the positioning hole for positioning. The positioning can also be achieved by increasing the damping of the rotation between the suspension arm 21 and the main body box top cover 11, for example, by adding spring leaf in a mounting hole of the main body box top cover 11, when rotation is required, the resistance of the spring leaf needs to be overcome, and when the external force is released, the spring leaf acts to jack the suspension arm 21 tightly against the main body box top cover 11.

In the second connection mode, the upper end of the suspension arm 21 can be pivotally connected to the guide rail head 2 by a bearing, a collar and so on, and the lower end of the suspension arm 21 can be removably connected to the main body box top cover 11 by a pin, a snap-fit structure, a threaded structure and so on. A circle of positioning holes can be provided on a lower end of the guide rail head 2, and a telescopic pin can be provided on the suspension arm 21. After the suspension arm 21 is rotated into place, the telescopic pin is extended and inserted into the positioning hole for positioning. The positioning can also be achieved by increasing the damping of rotation between the suspension arm 21 and the guide rail head 2, for example, by adding spring leaf in a mounting hole of the guide rail head 2, when rotation is required, the resistance of the spring leaf needs to be overcome, and when the external force is released, the spring leaf acts to jack the suspension arm 21 tightly against the guide rail head 2.

To sum up, in the light fixture provided in the disclosure, the guide rail head can be rotatably adjusted in the horizontal direction relative to the main body box, and the light barrel can be swung and adjusted in the vertical direction relative to the main body box, so that the irradiation angle and irradiation range of the light barrel can be adjusted to meet a variety of lighting needs.

The foresaid individual technical solutions can be combined according to requirements, so as to achieve the best technical effect.

What has been stated above are only principle and preferred embodiments of the present disclosure. It should be noted that, those skilled in the art can make various other modifications based on the principle of the present disclosure, all of which should be deemed to fall within the protection scope of the present disclosure.

The invention claimed is:

1. A light fixture, wherein, the light fixture comprises a main body box, a guide rail head positioned above the main body box and capable of rotating relative to the main body box, and a light barrel positioned on at least one side of the main body box and capable of swinging up and down relative to the main body box;

a radiator and a first light source are arranged in the light barrel;

the main body box comprises a main body box top cover, a main body box bottom plate and a main body box side plate connected between the main body box top cover and the main body box bottom plate;

the guide rail head is pivotally connected to the main body box top cover, and the light barrel is pivotally connected to the main body box side plate;

wherein, the light barrel is connected to the main body box side plate through a light barrel pivot shaft;

wherein, the light barrel pivot shaft is configured in an upper part of the main body box side plate or in a lower part of the main body box side plate;

wherein, the main body box side plate is provided with a holding groove and the light barrel pivot shaft is rotatably configured in the holding groove;

the light barrel pivot shaft is positioned in the holding groove by a fastener;

a groove bottom perforation is provided in a groove bottom of the holding groove;

the fastener passes from the main body box through the groove bottom perforation, the fastener is able to slide up and down in the groove bottom perforation; and the fastener is removably connected to the light barrel pivot shaft.

2. The light fixture according to claim 1, wherein, the light barrel pivot shaft is provided with a connection plate; and the connection plate is connected to the light barrel.

3. The light fixture according to claim 2, wherein, the light barrel pivot shaft is provided with a plugging plate; and the plugging plate is inserted into the light barrel and connected to the radiator.

4. The light fixture according to claim 1, wherein, more than two light barrels (3) are provided on at least one main body box side plate.

5. The light fixture according to claim 1, wherein, at least one light barrel is provided on each main body box side plate, and the light barrels on two main body box side plates are arranged symmetrically.

6. The light fixture according to claim 1, wherein, a second light source is provided in the main body box; and the main body box bottom plate is provided with light-transmitting holes, or the main body box bottom plate is a light guide plate.

7. The light fixture according to claim 1, wherein, a suspension arm is connected to the underside of the guide rail head;

an upper end of the suspension arm is removably connected to the guide rail head and a lower end of the suspension arm is pivotably connected to the main body box top cover; or an upper end of the suspension arm is pivotally connected to the guide rail head and a lower end of the suspension arm is removably connected to the main body box top cover.

* * * * *